United States Patent
Stanalajczo

[19]

[11] Patent Number: 5,960,654
[45] Date of Patent: Oct. 5, 1999

[54] SPARE TIRE CARRIER LOCK

[76] Inventor: Charles G. Stanalajczo, 2215 Winston, Sterling Heights, Mich. 48310

[21] Appl. No.: 09/039,138

[22] Filed: Mar. 13, 1998

Related U.S. Application Data

[60] Provisional application No. 60/040,825, Mar. 20, 1997.

[51] Int. Cl.$^6$ ............................................. E05B 65/12
[52] U.S. Cl. ................... 70/259; 224/42.21; 224/42.23; 224/42.25; 411/55; 411/65; 411/910
[58] Field of Search ................ 70/259, 260; 411/63–65, 411/55, 910; 224/42.21, 42.23, 42.25

[56] References Cited

U.S. PATENT DOCUMENTS

| | | | |
|---|---|---|---|
| 1,179,472 | 4/1916 | Tarleton | 411/64 |
| 1,225,468 | 5/1917 | Minnis | 411/65 |
| 1,429,299 | 9/1922 | Pleister | 411/65 |
| 2,719,747 | 10/1955 | Layne | 411/65 X |
| 4,526,021 | 7/1985 | Princell | 70/259 X |
| 4,789,282 | 12/1988 | Abraham | 411/63 X |
| 5,638,711 | 6/1997 | Schotthoefer | 70/259 |
| 5,730,567 | 3/1998 | Haseley et al. | 411/910 X |
| 5,758,523 | 6/1998 | Kozlowski, Jr. et al. | 70/259 |
| 5,802,895 | 9/1998 | Osgood | 70/259 |
| 5,827,029 | 10/1998 | Denman | 411/910 X |

FOREIGN PATENT DOCUMENTS

| | | | |
|---|---|---|---|
| 627318 | 2/1963 | Belgium | 411/63 |
| 74469 | 3/1983 | European Pat. Off. | 411/55 |
| 457893 | 2/1951 | Italy | 411/55 |
| 634865 | 2/1962 | Italy | 411/55 |
| 1141993 | 2/1969 | United Kingdom | 411/55 |

OTHER PUBLICATIONS

Owner's Manual for Chevrolet C/K Full–Size Pickup, 1998, pp. 5–26 of General Motors Corp., Detroit, MI.
Spare Tire Lock Instructions of McGard, Inc. of Orchard Park NY 14127, Dated Feb. 13, 1997.

*Primary Examiner*—Lloyd A. Gall
*Attorney, Agent, or Firm*—Peter D. Keefe

[57] ABSTRACT

A spare tire carrier lock including a split body collectively formed of at least two body sections, wherein the exterior shape of the split body is complementary to the shape of a predetermined socket of a hoist shaft of a hoist assembly for a spare tire carrier so as to be drivably received into the socket. The body sections are resiliently conjoined to form the split body via at least one, preferably two, resilient members. The split body has a first end at which a tapered seat is formed. A body shaft runs from the seat to a second end of the split body. A tapered armature is shaped to be seatably received by the seat and is provided with a threaded bore for being aligned with the body shaft. A head is located at the second end of the split body having a diameter which prevents its being received into the socket. A head shaft is provided in the head for being aligned with the body shaft, wherein opposite the split body, the head shaft is enlarged to form a recess. A lock bolt is received into the head and body shafts and threadably engages the armature. The lock bolt head is provided with at least one selected drive pattern, such as for example a hex socket with a center rod driven by a key driver having a complementary driving pattern.

5 Claims, 3 Drawing Sheets

SPARE TIRE CARRIER LOCK

CROSS-REFERENCE TO RELATED APPLICATIONS

The present application is a continuation-in-part application of provisional application 60/040,825, filed on Mar. 20, 1997, which is presently pending.

BACKGROUND OF THE INVENTION

1. Field of the Invention

The present invention relates to devices to prevent unauthorized access. More particularly, the present invention relates to spare tire carriers for pick-up trucks. Still more particularly, the present invention relates to a split body and a key driver therefor for restricting driving access to the hoist shaft of the spare tire carrier of a pick-up truck.

2. Description of the Prior Art

Motor vehicles carry a spare tire to enable a ready solution to a flat tire situation involving any one of the four driving tires. Problematically, this spare tire must be stored somewhere on (or in) the vehicle. For cars, the location of choice is in the trunk, and sometimes a smaller temporary tire is provided which advantageously takes up less room than a full size tire. Some sport utility vehicles utilize an external tailgate mount for the spare tire. In the case of pick-up trucks it is very desirable to have a full size spare tire, yet storage thereof in the bed or on the tailgate is not practical. Accordingly, the spare tire for pick-up trucks is typically stored via a spare tire carrier located under the bed, adjacent the rear axle of the vehicle.

FIG. 1 depicts the spare tire carrier 10 for a 1998 C/K full size Pick-up of Chevrolet Division, General Motors Corporation of Detroit, Mich. Beneath the bed 12 of the pick-up truck 14, the spare tire carrier 10 is connected with the frame (not shown) thereof. The spare tire carrier 10 is composed of a hoist assembly 16, a hoist shaft 18 emanating from the hoist assembly toward an opening 20 in the rear bumper 22, a hoist cable 24 connected with the hoist assembly, and a retainer 28 at the end of the hoist cable. A ratchet 30 is used to effect rotation of the hoist shaft 18.

In operation of the spare tire carrier 10, a spare tire (meaning an inflated tire mounted on its wheel) 32 is interfaced with the retainer 28 so that it can be lifted by the hoist cable 24. The hoist shaft 18, particularly the open end socket 18a thereof, has a non-circular geometry so that it is drivable by a complementarily shaped male driver extension 34 of the ratchet 30, which driver extension is received thereinside. By way of example, the 1998 C/K pick-up utilizes a hex shape for the hoist shaft and for the driver extension used therewith. Now, with the driver extension 34 being received into the socket 18a of the hoist shaft 18, the ratchet 30 is turned, thus turning the hoist shaft and actuating the hoist assembly 16 so as to cause retraction thereinto of the hoist cable 24. This is continued until the spare tire is raised to its stored position whereat it is tightly held next to the frame by the spare tire carrier 10.

Problematically, anyone can cause the hoist assembly 16 to be reversed to lower the spare tire, simply by using any suitable hex shaped tool. This invites thieves to steal the spare tire, since little effort is involved and there is no lock protection for the spare tire.

Accordingly, what is needed in the art is some device which prevents a spare tire carrier of a pick-up truck to be accessed only by authorized persons, wherein all the original components of the pick-up truck are not modified or replaced.

SUMMARY OF THE INVENTION

The present invention is a spare tire carrier lock and method of use therefor for the spare tire carrier of a pick-up truck, wherein all the original components of the pick-up truck are not modified or replaced, that inhibits anyone except those possessing a necessary key driver from operably accessing the hoist assembly of a spare tire carrier.

The spare tire carrier lock according to the present invention includes a split body collectively formed of at least two body sections (preferably bisections), wherein the exterior shape of the split body is complementary to the shape of a predetermined socket of a hoist shaft of a hoist assembly for a spare tire carrier so as to be drivably received into the socket. The body sections are resiliently conjoined to form the split body via at least one, preferably two, resilient members, such as for example elastomeric O-rings which are flushly received by grooves formed in the body sections. The split body has a first end at which a conical seat is formed. A body shaft runs from the conical seat to a second end of the split body. A conical armature is shaped to be seatably received by the conical seat and is provided with a threaded bore for being aligned with the body shaft. A head is located at the second end of the split body having a diameter which prevents its being received into the socket. A head shaft is provided in the head for being aligned with the body shaft, wherein opposite the split body, the head shaft is enlarged to form a recess. A lock bolt is received into the head and body shafts and threadably engages the conical armature. The lock bolt head is provided with at least one selected drive pattern, such as for example a hex socket with a center rod. A key driver has the complementary driving pattern to mate with the drive pattern of the lock bolt.

In operation of the spare tire carrier lock according to the present invention after raising the spare tire to its stored position via the spare tire carrier, the user grasps a previously assembled spare tire lock and then inserts the first end of the split body into the socket of the spare tire carrier hoist shaft. Next, the user uses the key driver to turn the lock bolt, whereupon the conical armature is drawn up further into the conical seat and, as a result, the body sections are caused to separate from each other. As the body sections separate, increasing force is applied to the hoist shaft thereby. Eventually a magnitude of force is reached whereat the spare tire carrier lock is tightly wedged inside the socket and cannot be pulled free of the hoist shaft. Indeed, the only way to remove the spare tire carrier lock is to unthread the lock bolt with respect to the conical armature, and this requires having a key driver with the proper driving pattern. Accordingly, would-be thieves are thwarted from stealing the spare tire, especially where a number of different driving/drive patterns are being assigned to vehicles of a certain make (so that a thief would need to carry an impractical number of differently patterned key drivers).

Accordingly, it is an object of the present invention to provide a device which thwarts spare tires from being stolen from spare tire carriers, wherein the original vehicle components are not modified or replaced.

It is a further object of the present invention to provide a spare tire carrier lock which occludes the hoist shaft of a spare tire carrier to thereby prevent driving of the hoist shaft, wherein removal of the spare tire carrier lock is only possible via a uniquely patterned key driver.

These, and additional objects, advantages, features and benefits of the present invention will become apparent from the following specification.

DETAILED DESCRIPTION OF THE PREFERRED EMBODIMENT

Figure 1:
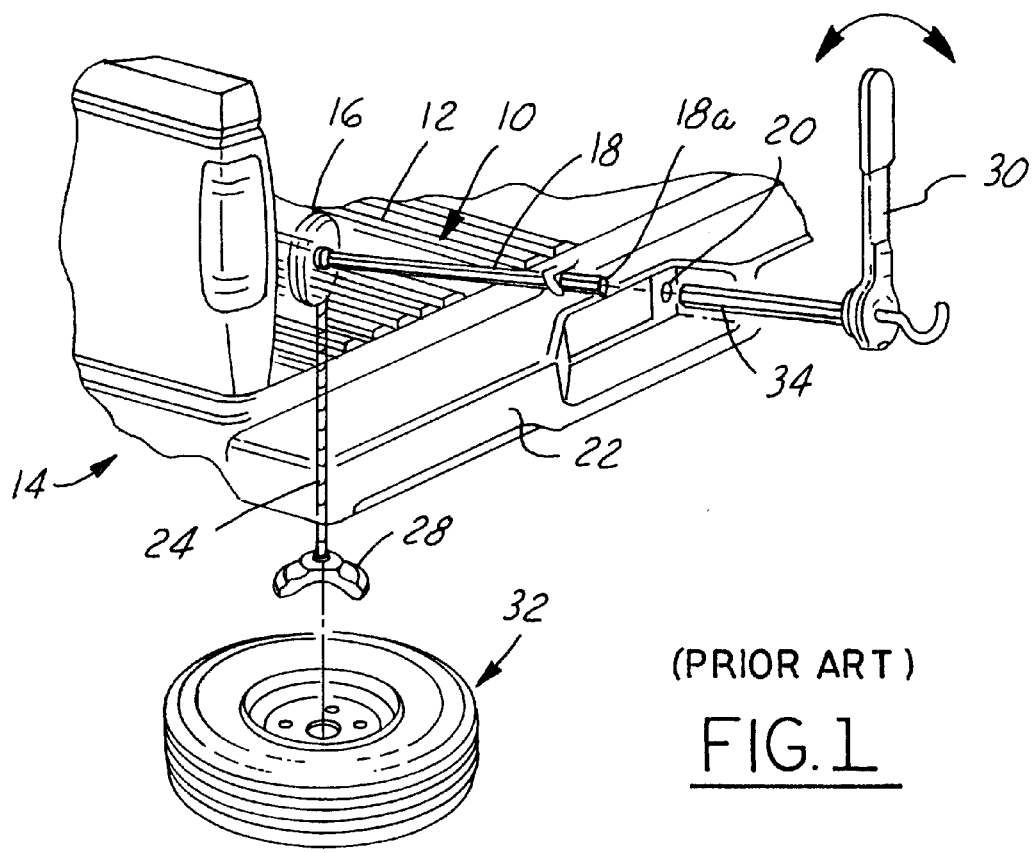
FIG. 1 is a perspective view of the rear end of a pick-up truck, wherein the conventional spare tire carrier thereof is depicted.
Figure 2:
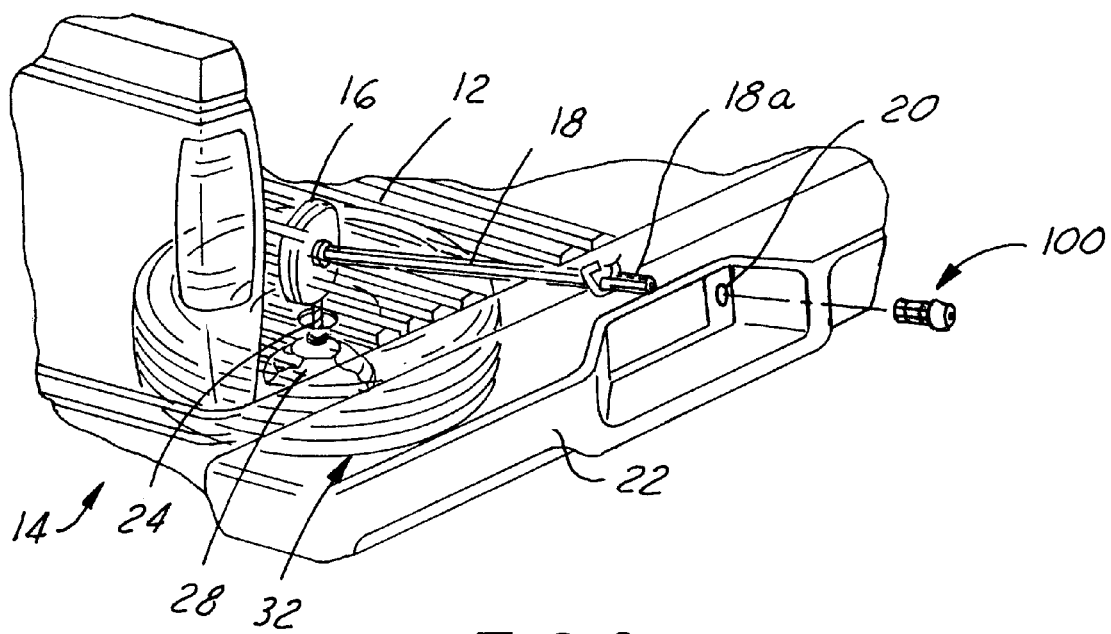
FIG. 2 is a perspective view of the rear end of a pick-up truck, wherein the spare tire carrier thereof is about to be equipped with the spare tire carrier lock according to the present invention.
Figure 3:
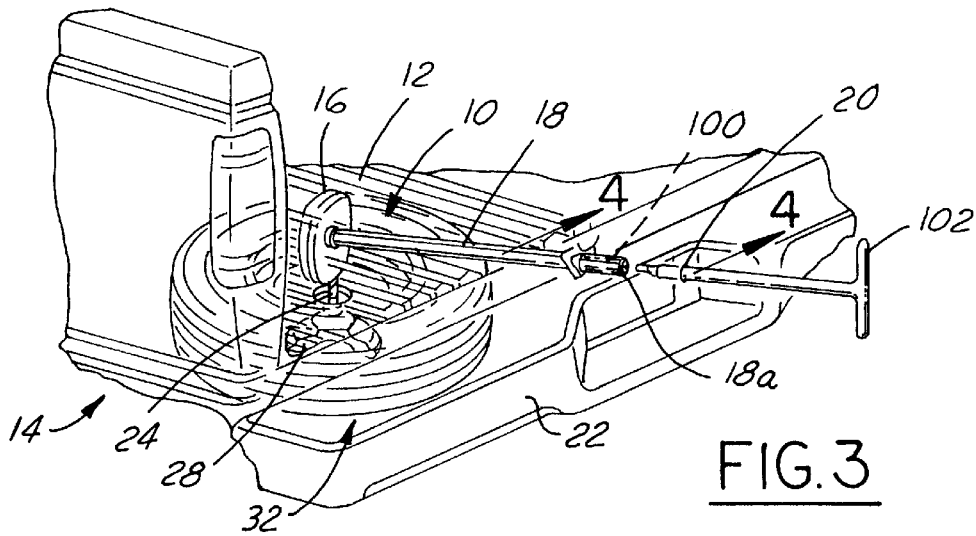
FIG. 3 is a perspective view of the rear end of a pick-up truck equipped with a spare tire carrier lock according to the present invention.
Figure 4:
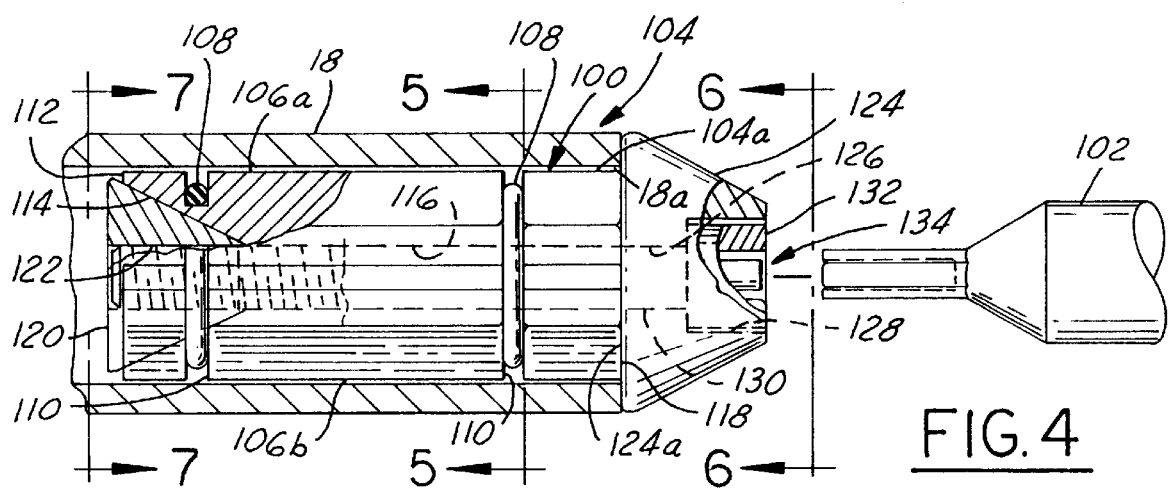
FIG. 4 is a detail partly sectional side view, seen along line 4—4 in FIG. 3, wherein the spare tire carrier lock is shown in an unlocked state.
Figure 7:
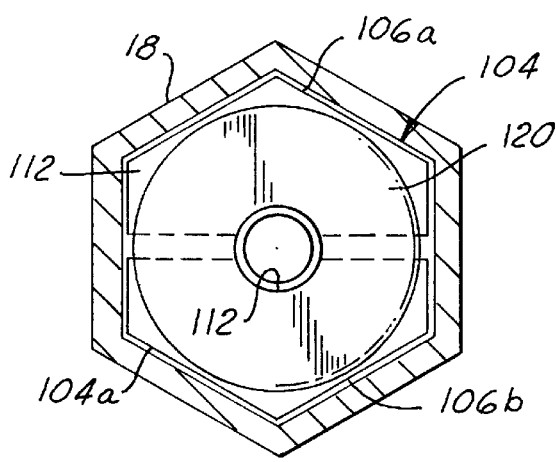
FIG. 7 is a partly sectional end view, seen along line 7—7 in FIG. 4.
Figure 5:
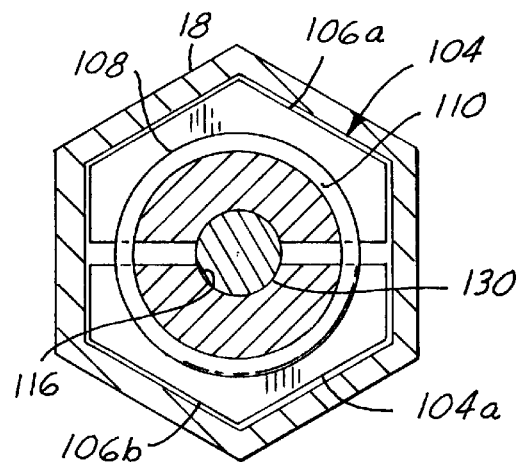
FIG. 5 is a partly sectional end view, seen along line 5—5 in FIG. 4.
Figure 6:
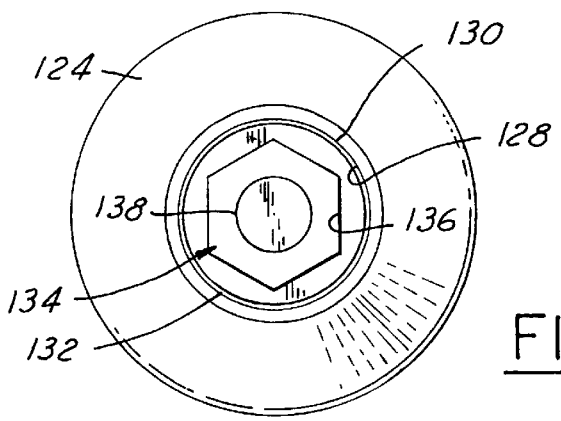
FIG. 6 is an end plan view, seen along line 6—6 in FIG. 4.
Figure 11:
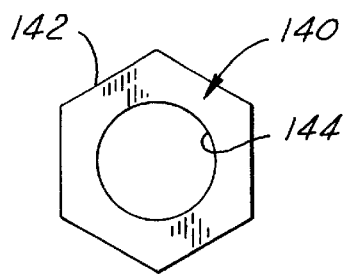
FIG. 11 is a front plan view, seen along arrow 11 of FIG. 10.
Figure 8:
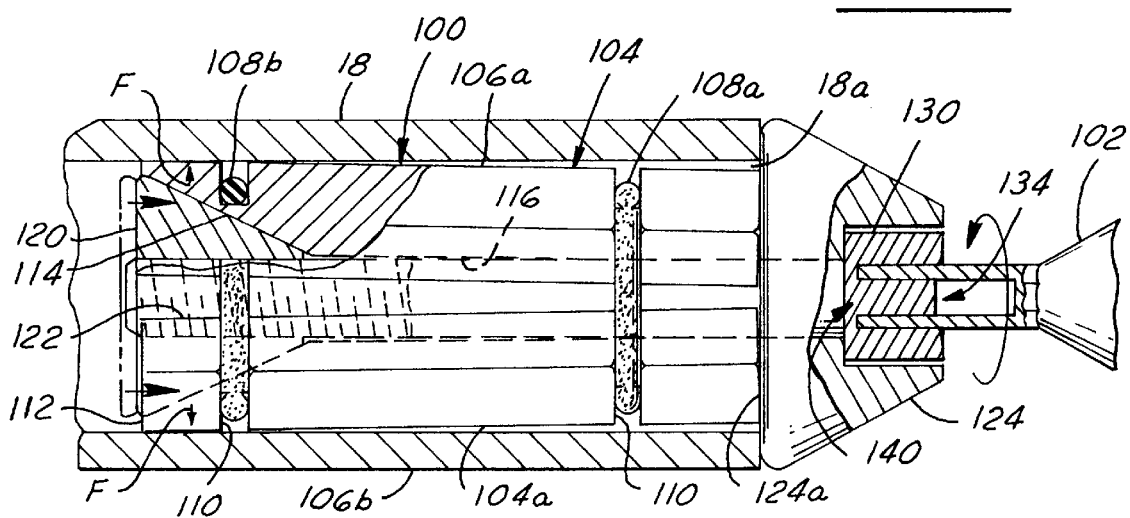
FIG. 8 is a detail partly sectional side view, similar to that of FIG. 4, wherein the spare tire carrier lock is now shown in a locked state.
Figure 9:
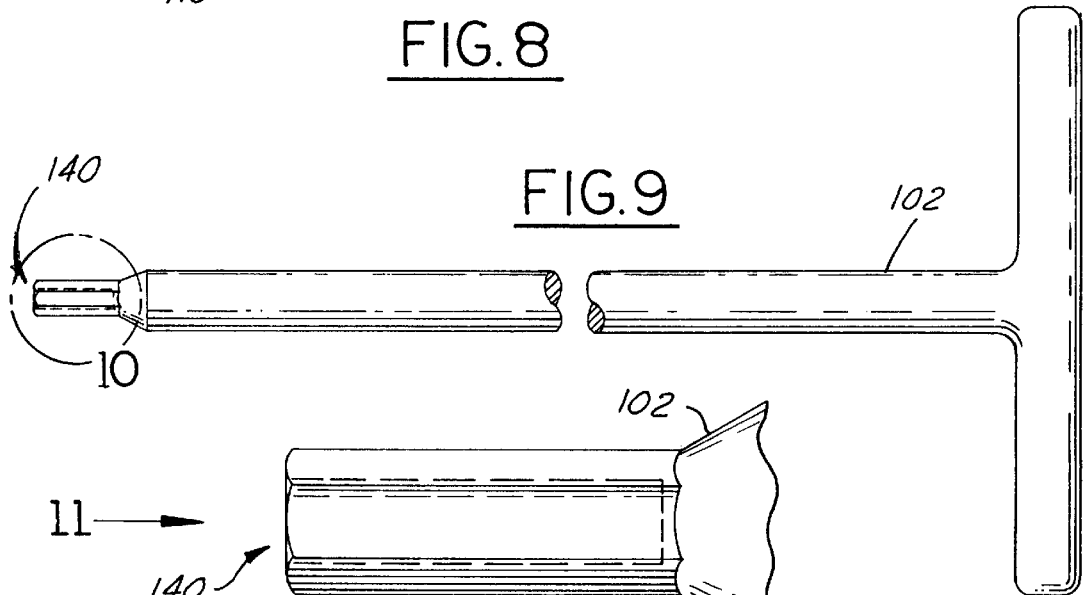
FIG. 9 is a partly sectional side view of a key driver according to the present invention.
Figure 10:
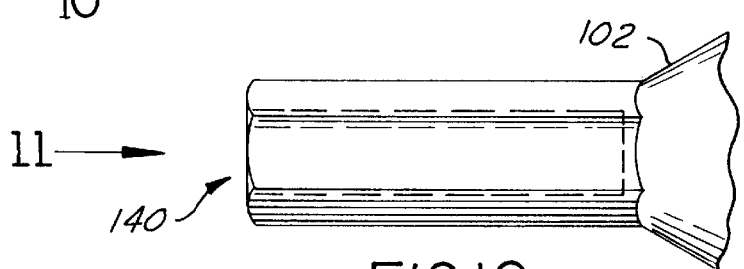
FIG. 10 is a detail, partly sectional side view, seen at circle 10 of FIG. 9.

Referring now to the drawing, FIGS. 2 and 3 depict an example of a spare tire carriage 10, as discussed hereinabove with reference to FIG. 1, which is located beneath the bed 12 of a pick-up truck 14. As recounted hereinabove, the spare tire carrier 10 is composed of a hoist assembly 16, a hoist shaft 18 emanating from the hoist assembly toward an opening 20 in the rear bumper 22, a hoist cable 24 connected with the hoist assembly, and a retainer 28 at the end of the hoist cable. A ratchet 30 (shown at FIG. 1) is used to effect rotation of the hoist shaft 18.

In order to prevent an unauthorized person from using the ratchet 30 (or any other usable drive tool such as a hex wrench) to rotate the hoist shaft 18, a spare tire carrier lock 100 according to the present invention is located at the socket 18a of the hoist shaft 18, thereby wedgably occluding the socket and preventing a drive tool from engaging the hoist shaft. Accordingly, no one, except a person having a key driver 102 which uniquely interfaces with the spare tire carrier lock 100 to thereby release it, can access the socket 18a to thereby drive the hoist shaft 18 to lower the spare tire 32.

Referring now additionally to FIGS. 4 through 11, the structure and function of the spare tire carrier lock 100 and its associated key driver 102 will be detailed with greater specificity.

The spare tire carrier lock 100 includes a split body 104 which is split lengthwise, preferably, but not necessarily, bisectionally, wherein the body sections 106a, 106b thereof collectively form the split body. The split body 104 has an exterior surface 104a having a shape which is complementary to the predetermined shape of the interior of the socket 18a of a hoist shaft 18 of a hoist assembly 16 for a spare tire carrier 10 so as to be snugly receivable into the socket. The body sections 106a, 106b are held together so as to provide the split body 104 via at least one contractively biased resilient member 108. Preferably, the resilient member 108 is in the form of two elastomeric O-rings 108a, 108b. Each elastomeric O-ring 108a, 108b is recessed into a respective groove 110 formed in the exterior surface 104a, such that the elastomeric O-ring is flush, or, preferably as shown, recessed below, the exterior surface 104a.

The split body 104 has a first end 112 at which a tapered seat 114 is formed. Preferably, the taper of the seat 114 is conical, but other tapering shapes could be used as will be explained hereinbelow. A body shaft 116 communicates with the tapered seat 114 and extends to a second end 118 of the split body 104 which is opposite to the first end 112.

A tapered armature 120 is shaped to be seatably received into the seat 114. The armature 120 has a threaded bore 122 which is aligned with the body shaft 116 when the armature is received into the seat 114. The seat 114 and the armature 120 are mutually configured so that an axial movement of the armature into the seat results in the body sections 106a, 106b being mutually spread apart at the area of the seat.

A head 124 is located at the second end 118 of the split body 104. The head 124 may be integral with any of the body sections 106a, 106b or may be a separate component. In this regard it is preferred for the head 124 to be a separate component having a frustoconical shape. The head 124 has a diameter (the diameter of the base 124a of the frustoconic shape) which is sufficiently large to prevent its being received into the socket 18a (see FIGS. 4 and 8). A head shaft 126 extends through the head 124 which aligns with the body shaft 116 when the head is centered on the split body 104. The head opposite the base 124a has a recess 128 which communicates with the head shaft 126 and which is enlarged with respect thereto.

A lock bolt 130 is received into the head and body shafts 126, 116 and threadably engages the armature 120 at the threaded bore 122 thereof. The lock bolt head 132 is received into the recess 128 but is too large to enter the head and body shafts 126, 116. The lock bolt head 132 is provided with at least one selected drive pattern 134, such as for example a hex socket 136 with a center rod 138 (see FIG. 6).

In order to drive the lock bolt 130, the aforementioned key driver 102 is provided having a driving pattern 140 which is complementary to that of the drive pattern 134 so that it is enabled to mate with the lock bolt head 132 at the drive pattern thereof. For example, where the drive pattern 134 is in the form of a hex socket 136 with a center rod 138, the driving pattern 140 would be a hex shank 142 having a center bore 144 (see FIG. 11).

In operation of the spare tire carrier lock according to the present invention after raising the spare tire to its stored position via conventional operation of the spare tire carrier 10, the user grasps an assembled spare tire lock 100 (that is, one having a conjoined split body 104 with the lock bolt 132 already loosely threaded onto with the armature 120) and then inserts the first end 112 of the split body into the socket 18a of the spare tire carrier hoist shaft 18. Next, the user uses the key driver 102 to turn the lock bolt, whereupon the armature is drawn up further into the seat 114 and, as a result, the body sections 106a, 106b are caused to be forceably spread apart from each other. As the body sections separate, an increasing magnitude of force is applied to the hoist shaft (see arrow F in FIG. 8). This force F creates a frictional interaction between the split body 104 and the socket 18a which prevents the spare tire carrier lock 100 from being pulled free of the hoist shaft.

While the head 124 may be cylindrically shaped, or of another shape, in order to make grabbing hold of the head 124 not reasonably possible with a plier-type tool by a would-be thief, the aforementioned frustoconical shape is employed which does not allow a grip to be generated on its conically tapering outer surface.

It should be noted that the normal lengthwise split relationship between the body sections may range from touching to being separated, due to the presence of the lock bolt, a short distance, as shown in the accompanying drawings. Nonetheless, the split body exterior surface 104a conforms receivably to the socket 18a prior to the armature and seat interaction cause further splitting.

It should be further noted that while a conically shaped armature and complementing conically shaped seat are preferred, that any tapering surface interaction, such as mutually interfacing acutely angled plane surfaces may suffice to cause to aforedescribed wedging of the split body with respect to the socket.

When the armature has moved up the seat sufficiently to tightly wedge the split body against the socket, the only way to remove the spare tire carrier lock 100 is to unthread the lock bolt with respect to the conical armature, and this requires having a tool with the proper driving pattern. Accordingly, would-be thieves are thwarted from stealing the spare tire, especially where a number of different driving/drive patterns are being assigned to vehicles of a certain make (so that a thief would need to carry an implausible number of differently patterned key drivers).

As discussed in Provisional Patent Application 60/040,825, filed on Mar. 20, 1997, which is hereby herein incorporated by reference, the pattern of the driving/drive patterns may be for example hex, star configured, octagonal, non-symmetrical, etc. The patterns are preferably varied among vehicles to thereby increase security. Further, the material of construction of the split body may be any suitable, preferably hard and non-weatherable, material, such as for example aluminum, plastic, resin, steel, rubber, etc.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A lock for a spare tire carrier having a hoist shaft, said lock comprising:
   a split body split lengthwise comprising at least two body sections, said split body having a first end and an opposite second end, said first end having a tapered seat, said split body having an exterior surface having a polygonal shape;
   a tapered armature structured for taperingly interfacing with said seat, wherein movement of said armature into said seat in a direction toward said second end results in said at least two body sections increasingly separating from each other;
   a frustoconical head located at said second end of said split body, said frustoconical head having a width that is maximum adjacent said split body and conically converges with increasing distance from said split body, said head having a center recess;
   movement means for moving said armature into said seat, wherein said movement means comprises:
      said split body having a body shaft extending from said tapered seat to said second end;
      a lock bolt having a portion thereof located in said body shaft, said lock bolt having a lock bolt head; and
      said armature having a threaded bore;
      wherein said lock bolt is threadably engaged with said threaded bore, wherein said lock bolt head is fully received in said center recess of said head to thereby hold said frustoconical head to said split body in freely rotatable relation to said split body;
   drive pattern means connected with said movement means for providing an engagement location for actuating said movement means, wherein said drive pattern means is located at said lock bolt head; and
   key driver means for actuating said movement means, said key driver means having driving pattern means for complementarily interfacing with said drive pattern means;
   wherein when said driving pattern means is engaged with said drive pattern means, said key driver means is enabled to actuate said movement means.

2. The lock of claim 1, further comprising resilient means for compressably biasing said at least two body sections toward each other.

3. The lock of claim 1, wherein said maximum width of said frustoconical head is wider than said exterior surface.

4. The lock of claim 1, wherein said armature and seat comprise:
   a conically shaped seat; and
   a conically shaped armature.

5. The lock of claim 1, wherein said at least two body sections comprise two body sections formed of a lengthwise bisection of said split body.

* * * * *